J. MELENDY.
Fruit-Gatherer.
No 11,170.
Patented June 27. 1854.
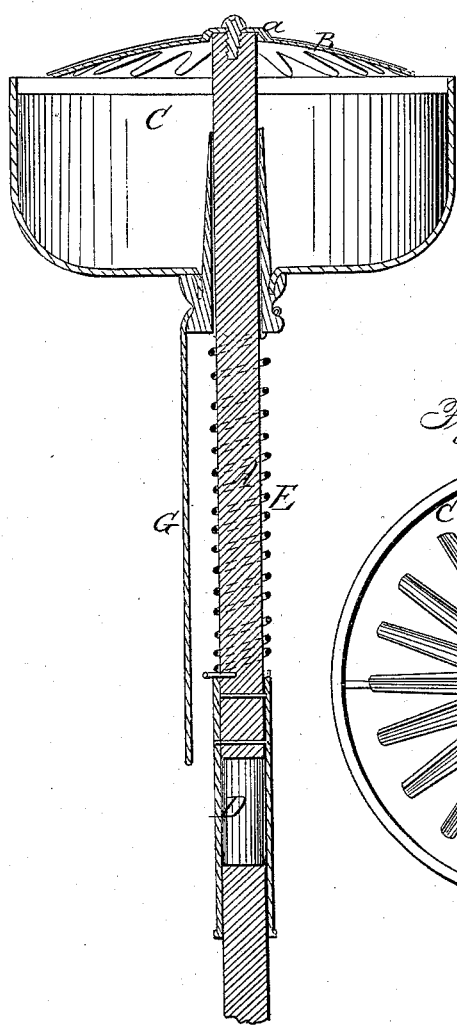
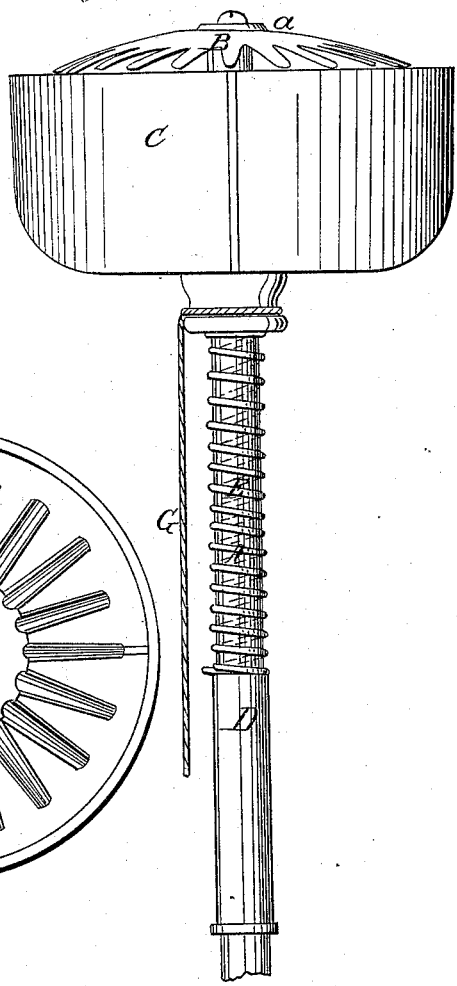
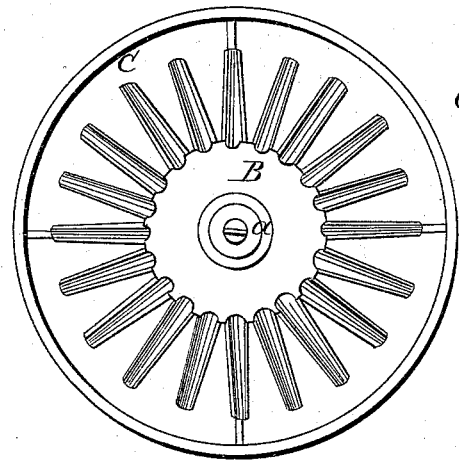

UNITED STATES PATENT OFFICE.

JOHN MELENDY, OF SOUTHBRIDGE, MASSACHUSETTS.

IMPROVED FRUIT-PICKER.

Specification forming part of Letters Patent No. 11,170, dated June 27, 1854.

*To all whom it may concern:*

Be it known that I, JOHN MELENDY, of Southbridge, in the county of Worcester and State of Massachusetts, have invented a new or Improved Fruit-Picker; and I do hereby declare that the same is fully described and represented in the following specification and the accompanying drawings, letters, figures, and references thereof.

Of the said drawings, Figure 1 represents a side elevation of my said fruit-picker. Fig. 2 is a top view of it. Fig. 3 is a vertical and central section of it.

In the said drawings, A denotes a round pole, having fixed upon its upper end a metallic star or serrated cover, and separator B, formed as seen in the drawings, and placed with its center resting on the top of the pole, its star points or teeth being made to extend to within a short distance of the rim of the basket C, that is placed directly underneath it, as seen in the drawings. The said basket has the pole extending through it or through a slide-tube, D, which is attached to the bottom of it, and moves freely up and down on the pole, the lower part of said basket being made to rest on a helical spring, E, that is coiled around the pole and has its lower end attached to the pole. A cord, G, or its equivalent, is attached to the lower part of the basket, and extends downward, so as to enable a person to depress the basket while he holds the pole in one hand and pulls it downward with the other. The basket may be arrested in its ascent by means of a stay-cord, a stop fixed to the pole, or any suitable equivalent therefor.

In using this instrument the basket is first to be depressed and the star separator or cover moved against the stem of a fruit hanging on a tree, so as to cause the said stem to pass between any two of the projecting teeth of the separator. The basket is then suffered to ascend or be thrown up by the spring, so as to inclose the fruit. Then by pulling downward the fruit will be separated from the branch on which it hangs and inclosed in the basket.

In making the serrated or star-shaped separator it may be cut out of a thin plate of metal by means of dies, and they may be so formed as to impart to each tooth such a bent or curved shape in a transverse direction as will tend very much to strengthen it. It may also be formed with a slight elevation or socket where it rests on the pole, such elevation or socket being seen at *a*.

I am aware that a fruit-picker has been made of a common fork, with two bent tines arranged on top of a pole and a basket suspended underneath the tines.

I am also aware that a fruit-picker has been made of a cylindrical vessel placed on the top of a pole, and having its upper edge armed with angular teeth raised on it. I therefore do not claim any such contrivances, nor the combination of a bifurcated pole and a basket hung to it, as they do not offer the facilities for gathering fruit that are found in my apparatus, as the movement of the basket of it up to the star-shaped separator enables a person to seize the fruit and remove it without bruising it against limbs or by its dropping too far or upon other fruit. Besides this the instrument, when among the branches of trees, may be moved from one fruit to another without the necessity of turning it around, the fruit being gathered by it with less labor and care than by the other instruments to which allusion has been made; but What I do claim as my invention is—

The application of the star or serrated cover or separator B and the sliding basket C on the pole, so as to extend entirely around it on the pole, and so that the serrated cover shall be stationary relatively to the pole and the basket be made to slide or move toward and away from the cover and be operated substantially as specified, the whole construction and arrangement of the parts rendering the instrument far more convenient and effective in use and less liable to bruise or injure the fruit gathered by it than any of the others to which reference has before been made.

In testimony whereof I have hereunto set my signature this 1st day of February, A. D. 1854.

JOHN MELENDY.

Witnesses:
JAMES GLEASON,
DANIEL F. BACON.